(12) United States Patent
Vust

(10) Patent No.: US 6,552,714 B1
(45) Date of Patent: Apr. 22, 2003

(54) PORTABLE POINTING DEVICE

(76) Inventor: Lyle A. Vust, 3040A Highway 60 Blvd., Sheldon, IA (US) 51201

( * ) Notice: Subject to any disclaimer, the term of this patent is extended or adjusted under 35 U.S.C. 154(b) by 293 days.

(21) Appl. No.: 09/608,564

(22) Filed: Jun. 30, 2000

(51) Int. Cl.[7] .................................................. G09G 5/08
(52) U.S. Cl. .................... 345/157; 345/158; 345/167; 345/184
(58) Field of Search .................................. 345/156–169, 345/184, 856; 463/37, 38; 273/148 B; 341/20, 21

(56) References Cited

U.S. PATENT DOCUMENTS

| | | | |
|---|---|---|---|
| 4,578,674 A | 3/1986 | Baker et al. | |
| 4,613,853 A | 9/1986 | Hosogoe et al. | |
| 4,954,817 A | 9/1990 | Levine | |
| D318,496 S | 7/1991 | Tse | |
| 5,175,534 A | * 12/1992 | Thatcher | 340/706 |
| 5,291,213 A | 3/1994 | Krauss | |
| 5,296,838 A | 3/1994 | Suzuki | |
| D357,947 S | 5/1995 | Richer | |
| 5,432,530 A | * 7/1995 | Arita et al. | 345/159 |
| 5,453,759 A | 9/1995 | Seebach | |
| 5,479,191 A | * 12/1995 | Komatsu | 345/161 |
| D366,655 S | 1/1996 | Sanchez et al. | |
| 5,481,265 A | * 1/1996 | Russell | 341/20 |
| 5,489,922 A | 2/1996 | Zloof | |
| 5,504,501 A | * 4/1996 | Hauck et al. | 345/158 |
| 5,638,092 A | * 6/1997 | Eng et al. | 345/156 |
| 5,724,106 A | 3/1998 | Autry et al. | |
| 5,790,105 A | 8/1998 | Yoshikawa | |
| 5,793,359 A | 8/1998 | Ushikubo | |
| 5,854,621 A | 12/1998 | Junod et al. | |
| 5,856,827 A | * 1/1999 | Sudo | 345/157 |
| 5,926,168 A | 7/1999 | Fan | |
| 5,940,066 A | 8/1999 | Weinblatt | |
| 6,184,863 B1 | * 2/2001 | Siber et al. | 345/156 |
| 6,297,808 B1 | * 10/2001 | Yang | 345/167 |

FOREIGN PATENT DOCUMENTS

| | | | | |
|---|---|---|---|---|
| WO | WO 93/04424 | * | 3/1993 | G06F/3/033 |

* cited by examiner

Primary Examiner—Lun-Yi Lao
(74) Attorney, Agent, or Firm—Kaardal & Leonard, LLP

(57) ABSTRACT

A finger mountable device for controlling a computer using a compact and highly portable control that does not need to be rested on a surface. The finger mountable device for controlling a computer includes a housing for mounting on a finger of a user. The housing has a front wall and a rear wall and a perimeter wall extending between the front and rear walls. The housing has a finger aperture for receiving a finger of a user's hand. The finger aperture extends through the housing between the front and rear walls. A first control is mounted on the housing for controlling movement of a cursor on the computer. The first control may comprise a knob movable in a plurality of radial directions for effecting a movement of the cursor in a corresponding direction. Further, the knob may be movable inward toward the housing for causing transmission of a first signal to a computer. Optionally, a second control may be provided on the housing for causing transmission of a second signal to a computer.

17 Claims, 3 Drawing Sheets

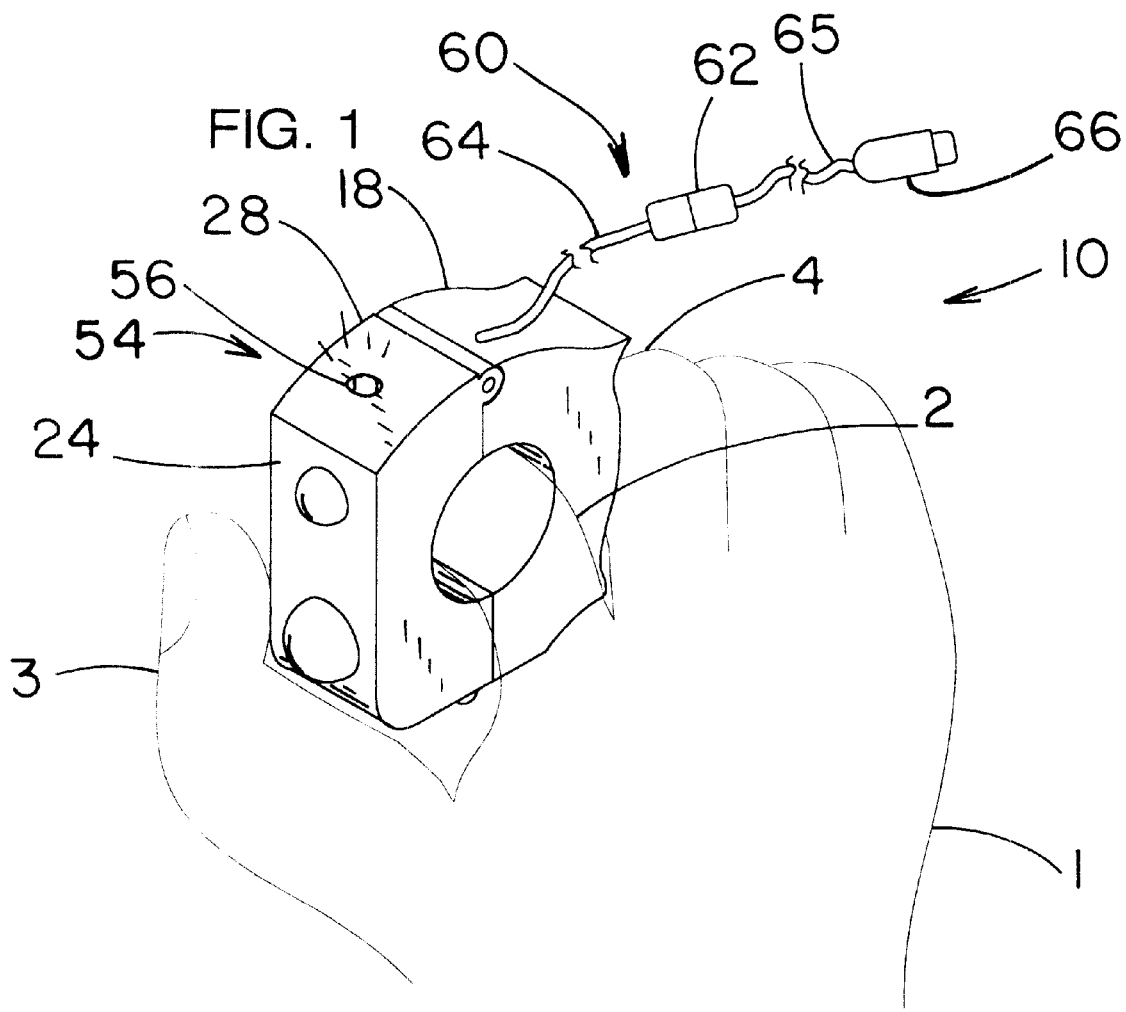
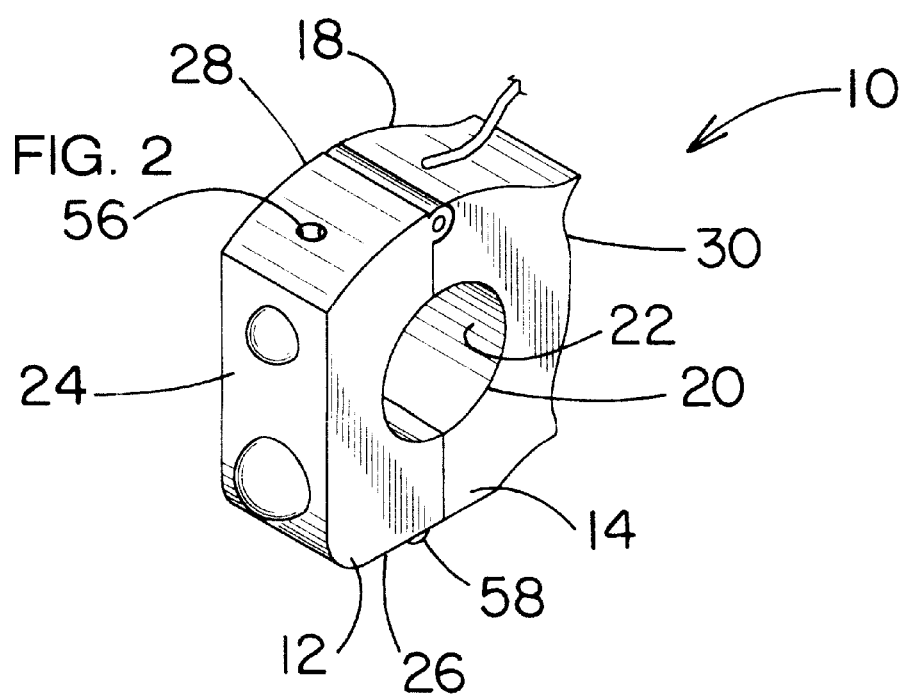

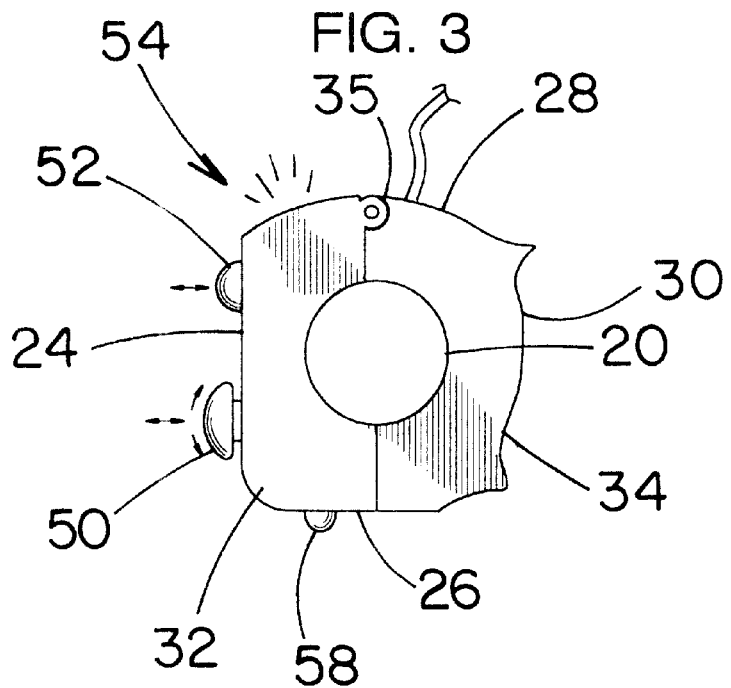
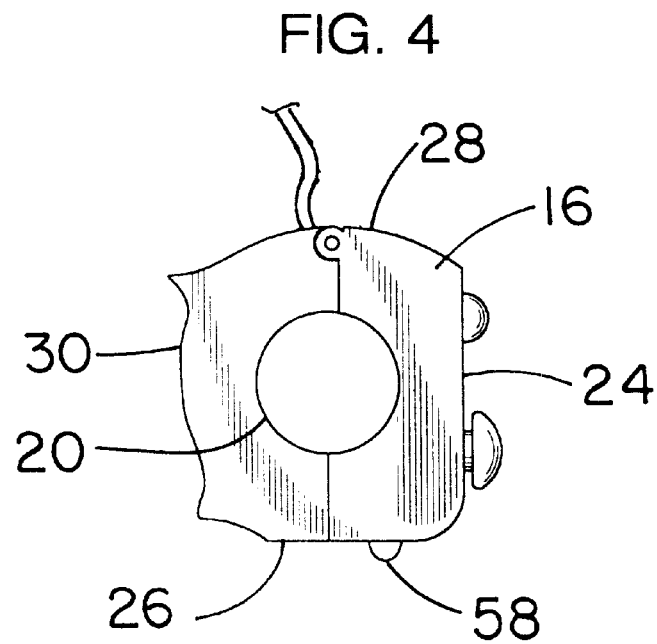

PORTABLE POINTING DEVICE

BACKGROUND OF THE INVENTION

1. Field of the Invention

The present invention relates to computer control devices and more particularly pertains to a new finger mountable device for controlling a computer using a compact and highly portable control that does not need to be rested on a surface.

2. Description of the Prior Art

The use of computer control devices is known in the prior art, particularly devices intended for controlling movements of a cursor on a display screen of a computer system. Most of these known devices are relatively bulky structures that often require the use of a tabletop surface, either for actuating a ball (such as in the case of a conventional computer mouse) or for supporting the device during use (such as in the case of trackballs, touch pads and the like). These devices are therefore of limited portability and usefulness where a supportive surface is not available. Other computer control devices operate wirelessly through infrared or radio frequency transmissions, and typically use the position and movement of one readily movable component of the device with respect to another stationary component of the device in order to determine the desired movement of the cursor. These devices also typically require a surface for operation for at least support. Still other computer control devices involve the use of hand mounted structures that include two components that produce cursor movement and computer control through the movement of the components with respect to each other or in concert with each other. The structures of many of these hand mounted devices hinders or even prevents simultaneous use of the device and operation of a keyboard of a computer.

What has been lacking in the known prior art is a device for controlling a computer that is unified in a single housing, that is characterized by being compact for use and transport with increasingly small portable computers, and that permits simultaneous use of the device and a keyboard without requiring removal of the hand of the user from the keyboard. Further, it is desirable to have a computer control device that permits intuitive movements of the device to produce similar or corresponding cursor movements on a display screen to permit easy training and subsequent use of the device.

SUMMARY OF THE INVENTION

In view of the foregoing disadvantages inherent in the known types of computer control devices now present in the prior art, the present invention provides a new finger mountable device that can be utilized without needing to be rested on a surface.

To attain this, the present invention generally comprises a housing for mounting on a finger of a user. The housing has a front wall and a rear wall and a perimeter wall extending between the front and rear walls. The housing has a finger aperture for receiving a finger of a user's hand. The finger aperture extends through the housing between the front and rear walls. A first control is mounted on the housing and is provided for controlling the computer, such as controlling movement of a cursor on a display screen of the computer system. The first control may comprise a knob movable in a plurality of radial directions for effecting a movement of the cursor in a corresponding direction. Further, the knob may be movable inward toward the housing for causing transmission of a first signal to a computer. Optionally, a second control may be provided on the housing for causing transmission of a second signal to a computer.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new finger mountable device for controlling a computer apparatus which does not need to be rested on a surface in order to operate the device, thus freeing the user from being located adjacent to a tabletop surface during use of the device.

It is another object of the present invention to provide a new finger mountable device for controlling a computer which is unified in a single housing that is characterized by being compact for use and transport, and is especially useful with the increasingly small portable computers.

It is a further object of the present invention to provide a new finger mountable device for controlling a computer which may permit simultaneous operation of the device and a keyboard without requiring removal of the user's hand from a position adjacent the keys of the keyboard in order to use the device.

An even further object of the present invention is to provide a new finger mountable device for controlling a computer which may permit intuitive movements of the device to produce similar or corresponding cursor movements to permit easy learning and use of the device.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic perspective view of a new finger mountable device for controlling a computer according to the present invention shown mounted for use on the hand of a user.

FIG. 2 is a schematic perspective view of the present invention.

FIG. 3 is a schematic first side view of the present invention.

FIG. 4 is a schematic second side view of the present invention.

DESCRIPTION OF THE PREFERRED EMBODIMENT

Figure 5:
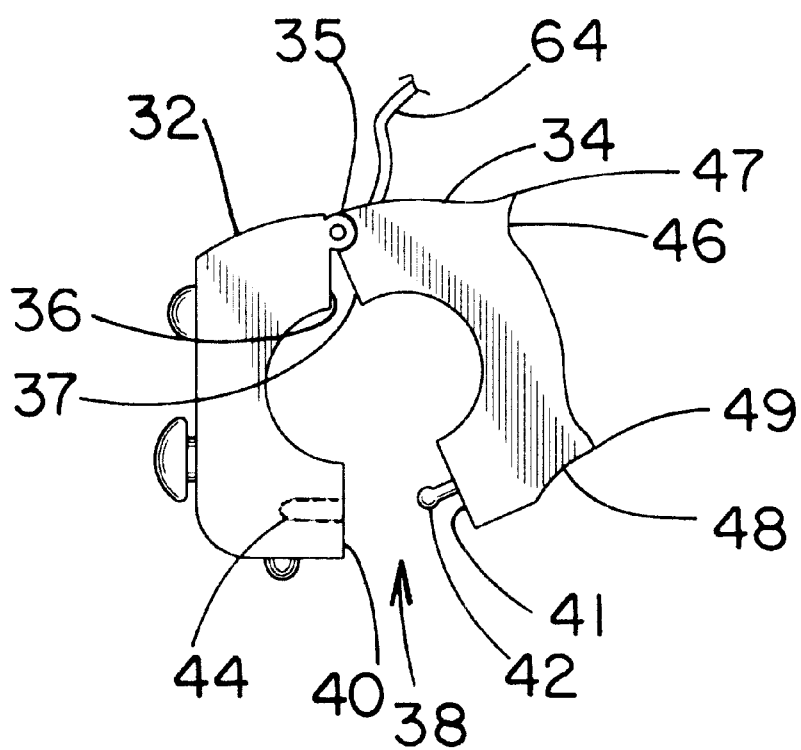
FIG. 5 is a schematic side view of the present invention shown with the housing portions pivoted into an open position.
Figure 6:
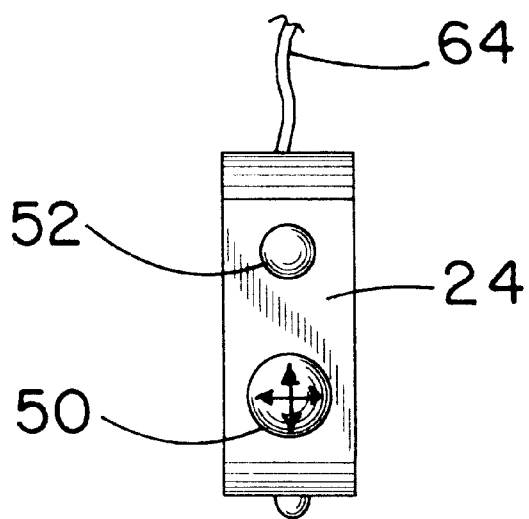
FIG. 6 is a schematic front view of the present invention.

With reference now to the drawings, and in particular to FIGS. 1 through 6 thereof, a new finger mountable computer control device embodying the principles and concepts of the present invention and generally designated by the reference numeral 10 will be described.

As best illustrated in FIGS. 1 through 6, the finger mountable device 10 of the invention is highly suitable for controlling a computer as an input device, and is most highly suitable for controlling the movements of a cursor on a display device of the computer.

The device 10 comprises a housing 12 that is adapted for mounting on a finger of a user. The housing 12 has a front wall 14 and a rear wall 16. A perimeter wall 18 extends between the front 14 and rear 16 walls.

The housing 14 has a finger aperture 20 for receiving a finger 2 of a user's hand 1. The finger aperture extends through the housing between the front 14 and rear 16 walls. The finger aperture 20 is defined by an interior wall 22 extending about the finger aperture. Most preferably, the interior wall of the finger aperture is substantially cylindrical for enhancing the comfort of the finger of the user while the device is being used. In a preferred embodiment of the invention, the housing is generally annular, with the distance between the interior wall and the perimeter wall being generally uniform along the perimeter wall. A variety of housings may be formed with finger apertures of different sizes for permitting selection of a housing with a finger aperture producing a snug fit on the finger of a user for resisting rotation of the housing with respect to the finger. Optionally, the housing may be provided with means for varying the size of the finger aperture.

The perimeter wall 18 of the housing preferably includes a control face portion 24 for locating computer controls thereon. The control face portion of the perimeter wall may have a substantially planar surface so that controls located thereon are easily accessed by a single the finger of the user. The perimeter wall 18 of the housing preferably further includes a base wall portion 26 located adjacent to the control face portion of the perimeter wall. Preferably, the base wall portion is generally planar, and is oriented in a plane substantially perpendicular to the control face portion. The perimeter wall 18 of the housing preferably further includes a top wall portion 28 located adjacent to the control face portion at an end of the control face portion opposite from the base wall portion 26. The top wall portion may have an arcuate configuration. The perimeter wall 18 of the housing preferably further includes a back wall portion 30 located opposite of the control face portion, and extending between the top and base wall portions. The back wall portion 30 may also be generally arcuate.

One preferred housing comprises two portions, including a first housing portion 32 and a second housing portion 34. The first 32 and second 34 housing portions may be pivotally connected together at first ends 36, 37 of the housing portions. The pivotally joined portions 32, 34 of the housing permit the finger aperture to be snugly sized to the size of the user's finger between the joints of the finger without requiring the joints of the finger to be forced through the smaller finger aperture 20 during installation and removal of the device. The pivotal connection of the housing portions 32, 34 may be produced through a hinge 35 joining the respective first ends 36, 37 of the housing portions. The first and second housing portions may each be generally arcuate for defining an annular housing shape and for defining a finger aperture through the housing.

A latch mechanism 38 may be provided for selectively locking the first 36 and second 37 housing portions against pivoting with respect to each other. The latch mechanism is located at the second ends 40, 41 of the first 36 and second 37 housing portions of the housing. In one embodiment of the invention, the latch mechanism comprises a protruding member 42 located on the second end of one of the housing portions, and a recess 44 located on the second end of the other of the housing portions. The protruding member 42 and the recess 44 are adapted for being selectively interlockable together, such as, for example, through a compressible bulbous portion on the end of the protruding member that snugly fits into the interior of the recess and provides a measure of resistance to removal from the recess.

The housing may have a first protrusion 46 for resting a finger 4 of the user against to resist rotation of the housing in a first direction when the housing is mounted on an adjacent finger 2. The first protrusion 46 extends radially outward from the back wall portion of the perimeter wall 18. The first protrusion may extend as a ridge 47 in a direction substantially opposite from a direction in which the surface of the control face portion is oriented, with a peak of the ridge extending between the front and rear walls.

The housing may also have a second protrusion 48 for resting the finger 4 of the user against to further resist rotation of the housing in a second direction when the housing is mounted on the adjacent finger 2. The second protrusion extends radially outward from the back wall portion of the perimeter wall. The second protrusion 48 is spaced from the first protrusion 46 such that a finger (such as the middle finger of the user's hand) is positionable between the first and second protrusions for resisting rotation of the housing in the first and second directions. The second protrusion may extend as a ridge 49 in a direction substantially opposite from a direction in which the surface of the control face portion is oriented, with a peak of the ridge extending between the front and rear walls.

A first control 50 is provided for controlling movement of a cursor on the computer. The first control 50 is mounted on the housing, and preferably is located on the control face portion 24 of the perimeter wall 18 of the housing for convenient actuation by, for example, the thumb of the user's hand. The first control 50 may comprise a knob that extends from one of the walls of the housing. The knob is preferably movable in a plurality of radial directions for effecting a movement of the cursor in a corresponding direction on the display of the computer system. The knob is further movable in a direction inward toward the housing (e.g., by pressing) for causing the device to transmit a first signal to the computer. The first signal may correspond to the signal transmitted by a computer mouse device upon the depression of the left button of the mouse device, or a "left click" signal.

A second control 52 may be provided for causing transmission of a second signal to a computer, such as a signal corresponding to the signal sent by a computer mouse device upon the depression of the right button the mouse device, or a "right click" signal. The second control 52 may comprise a second knob that extends from one of the portions of the perimeter wall of the housing. The second knob is preferably movable inward (e.g., by finger depression) toward the housing for causing the transmission of the second signal to the computer. The second control 52 is mounted on the housing 12, and is preferably located on the control face portion 24 of the perimeter wall 18 of the housing. The second control 52 is spaced from the first control 50 on the control face portion of the perimeter wall for permitting free movement of the first control without unintentional actuation of the second control. Preferably, the second control 52 is located relatively toward the top wall portion 28 of the perimeter wall of the housing, and conversely the first control 50 is located relatively toward the base wall portion 26 of the perimeter wall.

Optionally, a lighted pointer apparatus may be mounted on the housing. Preferably, the lighted pointer comprises a light emitter 54 mounted in the housing for emitting light through an opening 56 in the housing. The light emitter 54 may be mounted on one of the wall portions of the perimeter wall, and in one preferred embodiment the opening 56 of the light emitter is mounted on the top wall portion of the housing for easy pointing by the user. The light emitted by the light emitter may be directed in a direction extending parallel to the control face portion of the perimeter wall, such as is shown in FIG. 1. An actuating button 58 is mounted on the housing for selectively supplying power to the light emitter 54. Ideally, the actuating button is mounted on the same housing portion as the light emitter, and in one preferred embodiment of the invention the actuating button is mounted on the base wall portion 26 for pressing by the thumb of the user's hand without confusing with the other controls of the device.

A connection cord 60 may be provided for electrically linking the first and second controls of the device to a computer. The connection cord 60 may have a connector 62 interposed in the cord for permitting selective disconnection of segments 64, 65 of the cord. The connection cord 60 has a first end connected to the device and extending out of the housing, and a second end having a plug 66 for plugging into a jack on a computer (not shown). Optionally, a wireless transceiver system may be used to transmit signals between the device and a remote station connected to the computer to be controlled. A rechargeable power supply, such as, for example, a rechargeable battery, may be provided in the housing for supplying power to the device if no wire connection is provided between the device and the computer.

In use, the portions of the housing are pivoted into an open position, and the finger of the user is placed in the finger aperture of the housing. The housing portions are moved into a closed position with the locking mechanism engaged. Preferably, the index finger of the user may be selected for placement in the finger aperture. The housing may be positioned at various locations along the finger of the user, and preferably positioned between adjacent joints of the finger. Optionally, the housing may be positioned between the base joint (or knuckle) and the adjacent joint of the index finger, or the housing may be positioned on the middle segment of the index finger. Preferably, the control face portion of the perimeter wall is positioned toward the thumb of the user's hand, and the back wall portion of the perimeter wall is positioned toward the middle finger of the user's hand. In this orientation, the knobs of the first and second controls are positioned for convenient manipulation by the thumb of the user. The index finger of the user's hand is positioned between the first and second protrusions of the perimeter wall for resisting rotation of the housing about the index finger as the controls are manipulated by the thumb. Ideally, the movement of the first control corresponds to the resulting movement, for example, of the cursor on the display screen of the computer system. For example, movement of the first control in a direction toward the top wall portion results in an upward movement of the cursor, movement of the first control toward the base wall portion results in a downward movement of the cursor, and left and right movement of the first control results in similar left and right movements of the cursor on the display screen. Significantly, the device leaves the fingers of the user's hand free to operate keys of a keyboard without removing the device from the finger of the user, and free to operate the device without removing the fingers from the proximity of the keyboard.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A finger mountable device for controlling a computer, the device comprising:

a housing for mounting on a first finger of a user, the housing having a front wall and a rear wall and a perimeter wall extending between the front and rear walls, the housing having a finger aperture for receiving the first finger of a user's hand, the finger aperture extending through the housing between the front and rear walls, the perimeter wall of the housing having a control face portion, the control face portion extending in a plane oriented parallel to a longitudinal axis of the first finger when the housing is mounted on the first finger of the user for positioning the control face portion parallel to a second finger of the user situated adjacent to the first finger on the user's hand; and a first control mounted on the housing for controlling movement of a cursor on the computer, the first control being located on the control face portion of the perimeter wall, the first control extending outwardly from the control face portion along a control axis oriented substantially perpendicular to the longitudinal axis of the first finger when the housing is mounted on the first finger;

wherein the control face portion of the perimeter wall is substantially planar for positioning adjacent to a second finger of the user located on a first side of the first finger, and additionally comprising a pair of protrusions extending from the perimeter wall of the housing, each of the protrusions extending in a direction opposite of the control face portion of the perimeter wall and being spaced from each other to form a space for receiving a third finger of the user located on a second side of the first finger.

2. The device of claim 1 wherein the first control is movable in a plurality of radial directions from the control axis for effecting a movement of the cursor in a corresponding direction.

3. The device of claim 1 wherein the first control is movable inward along the control axis toward the housing for causing transmission of a first signal to a computer.

4. The device of claim 1 wherein the finger aperture is defined by an interior wall extending about the finger aperture, and wherein the distance bentween the interior wall and the perimeter wall is substantially uniform along the perimeter wall.

5. The device of claim 1 additionally comprising a second control for causing transmission of a second signal to a computer, the second control being mounted on the control face portion of the housing and extending perpendicular to the longitudinal axis of the first finger when the housing is mounted on the first finger of the user.

6. The device of claim 5 wherein the second control is spaced from the first control along an axis oriented substantially perpendicular to the longitudinal axis of the first finger when the housing is mounted on the first finger.

7. The device of claim 5 wherein the second control the control face portion along a second control axis oriented substantially perpendicular to the longitudinal axis of the first finger when the housing is mounted on the first finger.

8. The device of claim 7 wherein the second control is movable inward along a second control axis toward the housing for causing the transmission of the second signal to a computer.

9. The device of claim 1 additionally comprising a lighted pointer mounted on the housing, the lighted pointer comprising a light emitter mounted in the housing for emitting light through an opening in the housing.

10. The device of claim 9 additionally comprising an actuating button mounted on the housing for selectively supplying power to the light emitter.

11. A finger mountable device for controlling a computer, the device comprising:

a housing for mounting on a first finger of a user, the housing having a front wall and a rear wall and a perimeter wall extending between the front and rear walls, the housing having a finger aperture for receiving the first finger of a user's hand, the finger aperture extending through the housing between the front and rear walls; and a first control mounted on the housing for controlling movement of a cursor on the computer;

wherein the housing has a substantially semicircular first housing portion and a substantially semicircular second housing portion, the first and second housing portions being pivotally connected together at first ends of the housing portions to form an annular housing for encircling the first finger when the housing is mounted on the first finger.

12. The device of claim 11 wherein the first end and a second end of each of the first and second housing portions are located in a substantially common plane when the housing is in a closed condition.

13. The device of claim 11 additionally comprising a latch mechanism for selectively locking the first and second housing portions against pivoting with respect to each other in a closed condition.

14. A finger mountable device for controlling a computer, the device comprising:

a housing for mounting on a first finger of a user, the housing having a front wall and a rear wall and a perimeter wall extending between the front and rear walls, the housing having a finger aperture for receiving the first finger of a user's hand, the finger aperture extending through the housing between the front and rear walls, the perimeter wall of the housing having a control face portion, the control face portion extending in a plane oriented parallel to a longitudinal axis of the first finger when the housing is mounted on the first finger of the user for positioning the control face portion parallel to a second finger of the user situated adjacent to the first finger on the user's hand; and a first control mounted on the control face portion of the perimeter wall of the housing for controlling movement of a cursor on the computer;

wherein the housing has a first protrusion for resting against a third finger of the user to resist rotation of the housing on the first finger when the housing is mounted on the first finger of the user, the first protrusion extending from the perimeter wall in a direction generally opposite of the control face portion of the perimeter wall.

15. The device of claim 14 wherein the first protrusion comprises a ridge extending radially outward from the perimeter wall and extending between the front and rear walls of the housing.

16. The device of claim 14 wherein the housing has a second protrusion for resting against the third finger of the user against to resist rotation of the housing on the first finger when the housing is mounted on the first finger of the user, the second protrusion being spaced from the first protrusion along the perimeter wall to produce a space for resting the third finger against the perimeter wall when the housing is mounted on the first finger.

17. A finger mountable device for controlling a computer such as the movements of a cursor on a display device of the computer, the device comprising:

a housing for mounting on a finger of a user, the housing having a front wall and a rear wall and a perimeter wall extending between the front and rear walls;

the housing having a finger aperture for receiving a finger of a user's hand, the finger aperture extending through the housing between the front and rear walls, the finger aperture being defined by an interior wall extending about the finger aperture, wherein the distance between the interior wall and the perimeter wall is substantially uniform along the perimeter wall;

the perimeter wall of the housing having a control face portion for locating controls thereon, the control face portion of the perimeter wall having a substantially planar surface;

the perimeter wall of the housing having a base wall portion located adjacent to the control face portion of the perimeter wall, the base wall portion being oriented in a plane substantially perpendicular to the control face portion;

the perimeter wall of the housing having a top wall portion adjacent to the control face portion, the top wall portion having an arcuate configuration;

the perimeter wall of the housing having a back wall portion located opposite of the control face portion;

the housing having a first housing portion and a second housing portion, the first and second housing portions being pivotally connected together at first ends of the housing portions, each of the first and second housing portions being generally arcuate for defining a finger aperture through the housing, a latch mechanism for selectively locking the first and second housing portions against pivoting with respect to each other, the latch mechanism being located at the second ends of the first and second housing portions of the housing, the latch mechanism comprising a protruding member located on one end of one of the housing portions and a recess located on one end of the other of the housing portions, the protruding member and the recess being selectively interlockable together;

the housing having a first protrusion for resting a finger of the user against to resist rotation of the housing when the housing is mounted on an adjacent finger, the first protrusion extending radially outward from the perimeter wall, the first protrusion extending in a direction substantially opposite from a direction in which the surface of the control face portion is oriented;

the housing having a second protrusion for resting a finger of the user against to resist rotation of the housing when the housing is mounted on an adjacent finger, the second protrusion extending radially outward from the perimeter wall, the second protrusion being spaced from the first protrusion, the second protrusion extending in a direction substantially opposite from a direction in which the surface of the control face portion is oriented;

a first control for controlling movement of a cursor on the computer, the first control being mounted on the housing, the first control being located on the control face portion of the perimeter wall of the housing, the first control comprising a knob extending from one of the walls of the housing, the knob being movable in a plurality of radial directions for effecting a movement of the cursor in a corresponding direction, the knob being movable inward toward the housing for causing transmission of a first signal to a computer;

a second control for causing transmission of a second signal to a computer, the second control being mounted on the housing, the second control being located on the control face portion of the perimeter wall of the housing, the second control being spaced from the first control, the second control being located relatively toward a top portion of the perimeter wall of the housing and the first control being located relatively toward a base portion of the perimeter wall of the housing, the second control comprising a second knob extending from one of the walls of the housing, the second knob being movable inward toward the housing for causing the transmission of the second signal to a computer;

a lighted pointer mounted on the housing, the lighted pointer comprising a light emitter mounted in the housing for emitting light through an opening in the housing, the light emitter being mounted in one of the housing portions of the housing, the light emitted being directed in a direction parallel to the control face portion of the perimeter wall, an actuating button mounted on the housing for selectively supplying power to the light emitter, the actuating button being mounted on the same housing portion as the light emitter; and a connection cord for electrically linking the first and second controls to a computer, the connection cord having a connector interposed in the cord for permitting selective disconnection of segments of the cord, the connection cord having a first end extending out of the housing and a second end with a plug for plugging into a jack on a computer.

* * * * *